May 6, 1924.                                                          1,492,678
                          B. W. P. COGHLIN
                          BUMPER ATTACHER
                         Filed Dec. 17, 1923
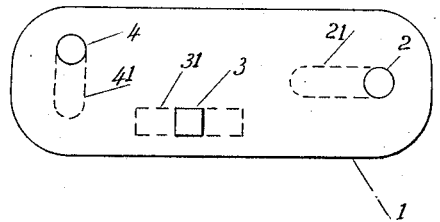
Fig. 1
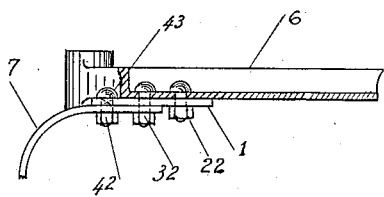   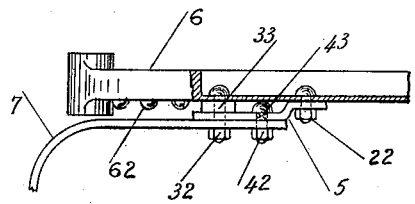
Fig. 2            Fig. 4
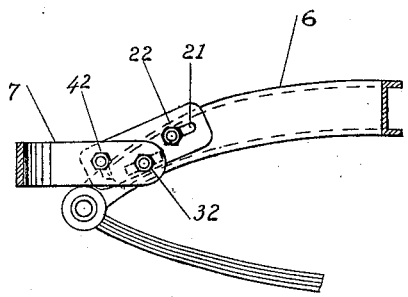   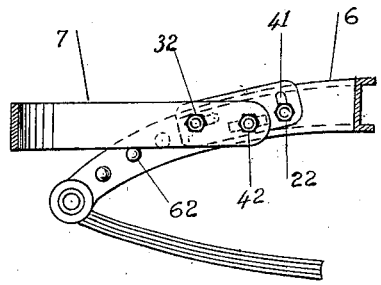
Fig. 3            Fig. 5
INVENTOR
Bernard William Palin Coghlin
BY
ATTORNEY Patented May 6, 1924.

1,492,678

UNITED STATES PATENT OFFICE.

BERNARD WILLIAM PALIN COGHLIN, OF MONTREAL, CANADA.

BUMPER ATTACHER.

Application filed December 17, 1923. Serial No. 681,171.

*To all whom it may concern:*

Be it known that I, BERNARD WILLIAM PALIN COGHLIN, a subject of the King of Great Britain and Ireland, residing at No. 2050 Ontario Street east, Montreal, Dominion of Canada, have invented new and useful Improvements in Bumper Attachers, of which the following is the specification.

My invention relates to automobile bumper attachers and has for its object to provide a means for attaching bumpers to automobile frames of various forms and designs.

A further object is to provide an attacher by means of which bumpers with standard punchings may be attached to car frames with punching of various spacing.

A further object is to provide an attacher of simple form and cheap construction and ready adjustment.

A further object is to provide an attacher that can be employed with car frames having holes punched in the web portion thereof adjacent to projections such as rivet heads on the surface of the frame.

A further object is to provide an attacher that does not interfere with any of the attachments on the car frame, such as mudguards, etc.

As the holes provided in car frames and bumpers for the purpose of attaching bumpers vary in distance apart, by means of this invention bumpers with holes punched to a standard can be readily secured and adjusted to car frames having holes punched at various distances apart.

Reference is made to the accompanying drawings in which:

Fig. 1 is a view of the attacher showing by dotted lines slots extending from the holes.

Fig. 2 is a top view of an attacher bolted to car frame and to bumper.

Fig. 3 is a side view of the arrangement of Fig. 2.

Fig. 4 is a top view of an offset attacher applied to a frame with projecting rivet heads.

Fig. 5 is a side view of the arrangement of Fig. 4.

In Fig. 1 the plate 1 is shown with three bolt holes 2, 3, and 4. The middle hole 3 is preferably adjacent one edge of the plate 1.

In order to provide for a variety of adjustments the bolt holes may be replaced by slots 41, 31 and 21, two of which are longitudinal and one transverse.

The plate 1 may be offset between the centre hole 3 and either of the end holes 2 and 4, as shown in Fig. 4, at 5.

The frame 6 of the usual channel iron construction has two bolt holes punched or drilled through its outer surface.

The bumper leaf 7 is also perforated with two holes.

Bolts 22, 32, 42, secure the frame 6, attacher 1, and bumper leaf 7, in adjustment, the bolt 32, securing all three members together, while the bolt 42 secures the attacher 1 to the bumper leaf 7. The bolt 22 secures attacher 1 to frame 6.

Bolt 42 is preferably made with a squared portion 43 where it passes through the attacher.

Where the frame has rivet heads 62, projecting from the surface to be covered by the attacher 1, an offset attacher is employed. A washer 33 is inserted between the frame 6 and the attacher 1, on the bolt 32. This is also the case when the bolt head 43 prevents the use of a flat attacher, as shown in Fig. 4.

By means of the slots 21, 31 and 41, the attacher 1 can be employed in attaching bumpers to a great variety of car frames owing to the many adjustments of which it is susceptible.

By means of the attacher 1 bumpers may be successfully secured to car frames which, owing to mudguards and other attachments make the use of the ordinary known forms of fastening device either difficult, inefficient or impossible.

The simple construction, cheap manufacture and easy application of this device supply a recognized need in the motor car industry.

What I claim and desire to secure by Letters Patent is:—

1. In a bumper attachment device the combination of a car frame and a bumper having perforated attaching leaves with an intermediate plate provided with three apertures, one of which provides a passage for a bolt connecting bumper leaf, attacher and car frame, one for a bolt connecting bumper leaf to attacher and one for a bolt connecting attacher and car frame.

2. In a bumper attachment device the combination of a car frame and a bumper having perforated attaching leaves with an intermediate plate provided with three slots, one of which provides a passage for a bolt connecting bumper leaf, attacher and car frame, one for a bolt connecting bumper leaf to attacher and one for a bolt connecting attacher and car frame.

3. In a bumper attachment device the combination of a car frame and a bumper having perforated attaching leaves with an intermediate plate between the car frame and bumper leaf having three perforations to receive bolts two of which are positioned a distance apart standard to the perforations in the bumper leaf and the third perforation with one of the other two, positioned a distance apart to equal that of two perforations in the car frame.

4. In an automobile attachment device the combination of an automobile having frame members provided with apertures and a bumper having leaves provided with apertures, with an attacher having three apertures respectively, and bolts adapted to secure respectively the attacher to the frame, the attacher to the bumper leaf, and the frame, attacher and bumper leaf together.

5. In automobile attachment devices the combination of an automobile having frame members provided with apertures and a bumper having leaves provided with apertures, with an attacher having three apertures respectively, the portion of the attacher adjacent to one of the apertures being offset to the plane of the attacher, and bolts adapted to secure respectively the attacher to the frame, the attacher to the bumper leaf, and the frame, attacher and bumper leaf together.

6. In an automobile bumper attaching device, a car frame and a bumper with attaching leaves in combination with an attaching plate with a central aperture and end apertures two of which correspond to apertures in the bumper leaf and one of which latter apertures and the third aperture correspond to apertues in the automobile fame and bolts to secure leaf to plate, plate to frame, and leaf, plate and frame together.

7. In an automobile bumper attaching device, a car frame and a bumper with attaching leaves in combination with an attaching plate with a central aperture and end apertures, one of which is in an offset portion of the plate, a washer, and bolts adapted to secure bumper to plate, plate to frame and bumper plate washer and frame together through such apertures.

BERNARD WILLIAM PALIN COGHLIN.